US011543645B1

(12) United States Patent
Miller et al.

(10) Patent No.: US 11,543,645 B1
(45) Date of Patent: Jan. 3, 2023

(54) OPTICAL BEAM EXPANDER WITH PARTIAL MONOLITHIC STRUCTURE

(71) Applicant: Meta Platforms, Inc., Menlo Park, CA (US)

(72) Inventors: Eric Douglas Miller, Sherman Oaks, CA (US); Slaven Moro, San Diego, CA (US); Harvard Keese Harding, Jr., Simi Valley, CA (US); Eric Booen, Thousand Oaks, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/205,465

(22) Filed: Mar. 18, 2021

Related U.S. Application Data

(60) Provisional application No. 62/991,776, filed on Mar. 19, 2020.

(51) Int. Cl.
*G02B 23/12* (2006.01)
*G02B 27/30* (2006.01)
*G02B 23/10* (2006.01)

(52) U.S. Cl.
CPC .............. *G02B 23/12* (2013.01); *G02B 23/10* (2013.01); *G02B 27/30* (2013.01)

(58) Field of Classification Search
CPC .............. G02B 3/12; G02B 3/10; G02B 27/30
See application file for complete search history.

(56) References Cited

U.S. PATENT DOCUMENTS

| | | | |
|---|---|---|---|
| 4,635,299 A * | 1/1987 | MacGovern | H04B 10/1125 356/153 |
| 4,867,560 A | 9/1989 | Kunitsugu | |
| 5,517,016 A * | 5/1996 | Lesh | G01B 11/272 356/152.2 |
| 6,280,058 B1 * | 8/2001 | Horigome | G02B 21/082 362/268 |
| 6,731,415 B1 | 5/2004 | Plett | |
| 6,731,833 B2 | 5/2004 | Sandler et al. | |

(Continued)

FOREIGN PATENT DOCUMENTS

WO    2020/112517 A1    6/2020

OTHER PUBLICATIONS

Roy et al. "Optical Feeder links for High Throughput Satellites", ICSOS IEEE Conference, Oct. 26, 2015, pp. 1-6.

(Continued)

*Primary Examiner* — William R Alexander
*Assistant Examiner* — Sharrief I Broome
(74) *Attorney, Agent, or Firm* — Greenberg Traurig, LLP

(57) ABSTRACT

The disclosed optical beam expander may include (1) a monolithic structure including (a) a first nonplanar mirror that receives a first collimated optical beam having a first width and reflects the first collimated optical beam to generate a noncollimated optical beam and (b) a second nonplanar mirror that receives a diverging optical beam and reflects the diverging optical beam to generate a second collimated optical beam having a second width greater than the first width, where the first nonplanar mirror and the second nonplanar mirror are fixed in orientation and position relative to each other and (2) a planar mirror that reflects the noncollimated optical beam from the first nonplanar mirror to provide the diverging optical beam to the second nonplanar mirror. Various other devices, systems, and methods are also disclosed.

18 Claims, 4 Drawing Sheets

(56) References Cited

U.S. PATENT DOCUMENTS

| | | | |
|---|---|---|---|
| 6,819,874 B2 | 11/2004 | Cheng et al. | |
| 6,968,098 B2 | 11/2005 | Barrett | |
| 8,362,410 B2 | 1/2013 | King et al. | |
| 8,383,982 B2 | 2/2013 | Bruland et al. | |
| 9,306,668 B2 | 4/2016 | DeVaul et al. | |
| 9,917,633 B2 | 3/2018 | DeVaul et al. | |
| 10,003,402 B2 | 6/2018 | Boroson et al. | |
| 10,298,325 B1 | 5/2019 | Birnbaum et al. | |
| 10,313,000 B2 | 6/2019 | Buer et al. | |
| 10,365,211 B2 | 7/2019 | Blasenheim et al. | |
| 10,411,829 B2 | 9/2019 | Birnbaum et al. | |
| 2002/0080357 A1* | 6/2002 | Dana | G01N 21/55 356/445 |
| 2002/0167702 A1 | 11/2002 | Badesha et al. | |
| 2002/0196506 A1* | 12/2002 | Graves | H04B 10/1125 398/126 |
| 2004/0042798 A1 | 3/2004 | Kehr et al. | |
| 2004/0141754 A1 | 7/2004 | Cheng et al. | |
| 2006/0023202 A1* | 2/2006 | Delacour | G01N 21/55 356/121 |
| 2006/0024061 A1 | 2/2006 | Wirth et al. | |
| 2011/0268453 A1 | 11/2011 | Fest et al. | |
| 2015/0188628 A1 | 7/2015 | Chalfant, III et al. | |
| 2015/0215040 A1 | 7/2015 | Dickson et al. | |
| 2015/0249498 A1 | 9/2015 | Minguez Rascon et al. | |
| 2016/0182140 A1 | 6/2016 | DeVaul et al. | |
| 2016/0204861 A1 | 7/2016 | Boroson et al. | |
| 2016/0204865 A1 | 7/2016 | Boroson et al. | |
| 2016/0204866 A1 | 7/2016 | Boroson et al. | |
| 2017/0054499 A1 | 2/2017 | Graves et al. | |
| 2017/0054527 A1 | 2/2017 | Birnbaum et al. | |
| 2017/0183095 A1 | 6/2017 | Liu et al. | |
| 2017/0366262 A1 | 12/2017 | Turgeon et al. | |
| 2018/0019816 A1 | 1/2018 | Wang et al. | |
| 2018/0191428 A1 | 7/2018 | Hemmati et al. | |
| 2019/0078858 A1 | 3/2019 | Miller et al. | |
| 2019/0081703 A1 | 3/2019 | Miller et al. | |
| 2019/0094130 A1* | 3/2019 | Blasenheim | G01B 11/02 |
| 2019/0245265 A1 | 8/2019 | Booen et al. | |
| 2020/0169323 A1 | 5/2020 | Moro | |
| 2020/0396003 A1 | 12/2020 | Moro | |

OTHER PUBLICATIONS

Dimitrov et al., "Digital Modulation and Coding for Satellite Optical Feeder Links", ASMS/SPSC Conference (IEEE), Sep. 8, 2014, 10 pages.

Dimitrov et al., "Digital Modulation and Coding for Satellite Optical Feeder Links with Pre-distortion Adaptive Optics", Int. J. Satell. Comm. Network., Nov. 11, 2015, pp. 1-22.

\* cited by examiner

OPTICAL BEAM EXPANDER WITH PARTIAL MONOLITHIC STRUCTURE

CROSS REFERENCE TO RELATED APPLICATION

This application claims the benefit of U.S. Provisional Application No. 62/991,776, filed 19 Mar. 2020, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
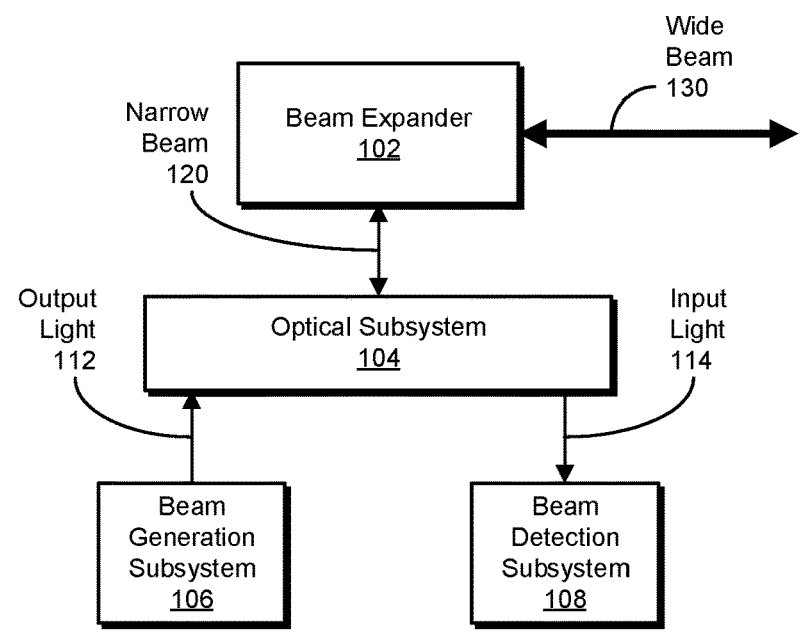
FIG. 1 is a block diagram of an exemplary optical beam telescope in which embodiments of an optical beam expander, as discussed herein, may be employed.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Optical beam (e.g., collimated optical beam) expanders are employed in some optical communication systems to expand and/or contract the width or diameter of an optical beam such that a wide optical beam that carries communication data across free space may be created from, and/or employed to generate, a narrower version of the beam as employed within an optical communication device, such as an optical communication telescope.

In many optical communication systems, multiple mirrors or similar optical elements may be utilized to expand and/or contract an optical beam. Typically, these components may require proper alignment via some procedure to ensure that the beam correctly enters and exits the optical beam expander for acceptable operation of the system. More specifically, in some optical beam expander designs, careful alignment of one or more of the components is to be performed through six degrees of freedom (e.g., translated along three orthogonal directions and rotated about three orthogonal rotational axes).

The present disclosure is generally directed to an optical beam expander that may include a monolithic structure defining, carrying, or otherwise mechanically coupled to two nonplanar (e.g., paraboloidal) mirrors. The optical beam expander may further include a planar (flat) mirror located such that a first optical beam may be received at a first of the nonplanar mirrors, which directs the received light to the planar mirror. In turn, the planar mirror may reflect that light to a second of the nonplanar mirrors, which then directs the received light as a second optical beam having a different width than, and being skewed from, the first optical beam. In some embodiments, as is described more fully below, the use of the monolithic structure may reduce the amount of adjustment to be performed relative to that of conventional optical beam expanders.

Features from any of the embodiments described herein may be used in combination with one another in accordance with the general principles described herein. These and other embodiments, features, and advantages will be more fully understood upon reading the following detailed description in conjunction with the accompanying drawings and claims.

The following provides, with reference to FIGS. 1-4, detailed descriptions of exemplary optical beam expanders employing a partial monolithic structure, along with discussions of operational methods thereof. An exemplary optical beam telescope in which embodiments of the optical beam expanders discussed herein may be employed is described in conjunction with FIG. 1. Exemplary optical beam expanders are discussed in connection with FIGS. 2 and 3, while an exemplary method of expanding an optical beam using such an expander is described in association with FIG. 4.

FIG. 1 is a block diagram of an exemplary optical beam telescope 100 in which embodiments of an optical beam expander 102 (or, alternatively, an "afocal telescope"), as discussed in greater depth herein, may be employed. However, various embodiments of optical beam expanders, as described below, may be incorporated into other types of optical beam telescopes, as well as other optical systems not discussed herein.

As depicted in FIG. 1, optical beam telescope 100 may include a beam expander 102, an optical subsystem 104, a beam generation subsystem 106, and a beam detection subsystem 108. Other subsystems or components may be included in optical beam telescope 100 in other examples but are not discussed herein to simplify and focus the following discussion. Optical beam telescope 100 may be employed in an optical communication system to transmit and/or receive communication data by way of a wide (e.g., collimated) beam 130 (e.g., through free space, such as between orbiting satellites, or between an orbiting satellite and a ground station). In at least some examples, wide beam 130 may be a relatively wide (e.g., several centimeters in diameter or width) such that diffraction-induced divergence of wide beam 130 is limited so that a significant amount of optical power is delivered from a transmitting telescope to a receiving telescope.

To that end, beam expander 102, in some embodiments, may expand a narrow beam 120 (e.g., narrower that wide beam 130) produced within optical beam telescope 100 to produce wide beam 130 (e.g., in a data transmission path) and/or to contract wide beam 130 to produce narrow beam 120 (e.g., in a data reception path). Narrow beam 120, in some examples, may be a collimated optical beam having a width or diameter of less than a centimeter. In some examples, narrow beam 120 may be more compatible with optical subsystem 104, beam generation subsystem 106, and beam detection subsystem 108 than wide beam 130 due to the relatively small dimensions of components that may be employed within these subsystems.

In some embodiments, beam generation subsystem 106 may employ a laser or other light generating component in conjunction with a light modulator to generate output light 112 (e.g., collimated light, converging light, and/or diverging light) that incorporates or includes communication data to be carried via wide beam 130. In some examples, optical subsystem 104 may optically convert or condition output light 112 (e.g., using one or more lenses, prisms, mirrors, or other optical components) to produce narrow beam 120 for reception by beam expander 102, which may then expand narrow beam 120 to transmit wide beam 130. Moreover, optical subsystem 104 may condition or convert narrow beam 120 received from beam expander 102 (e.g., derived from wide beam 130 received at beam expander 102) to produce input light 114 (e.g., collimated light, converging light, and/or diverging light) for beam detection subsystem 108. In turn, beam detection subsystem 108 may employ an optical detector in conjunction with electronic circuitry (e.g., to extract communication data from input light 114 being received in wide beam 130 and carried via narrow beam 120). Consequently, in some embodiments, beam expander 102 may facilitate both transmission and reception of wide beam 130 (e.g., in a full-duplex manner) to transmit and receive communication data, respectively.

Figure 2:
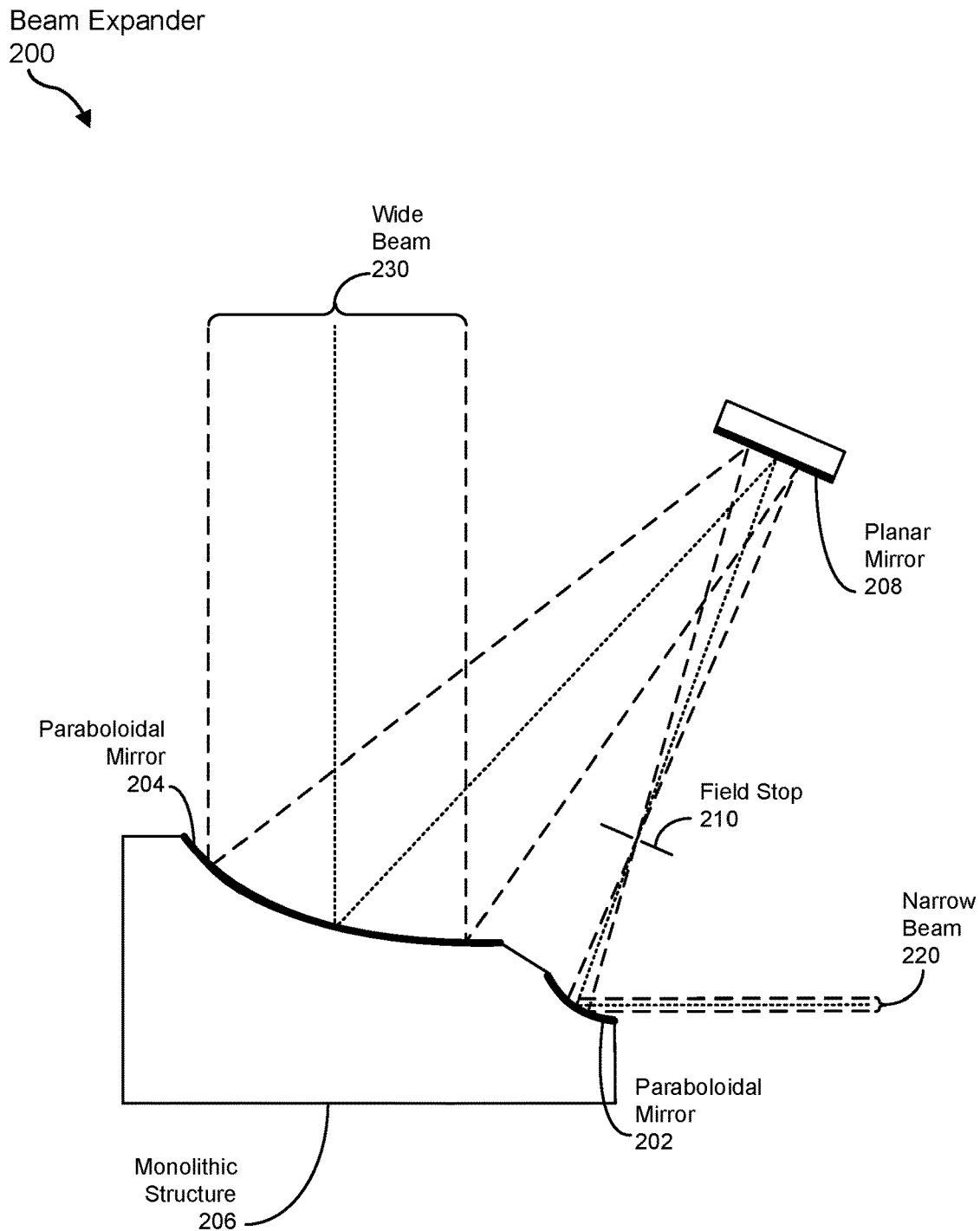
FIG. 2 is a side view of an exemplary optical beam expander that includes two concave paraboloidal mirrors in conjunction with a planar mirror.
Figure 3:
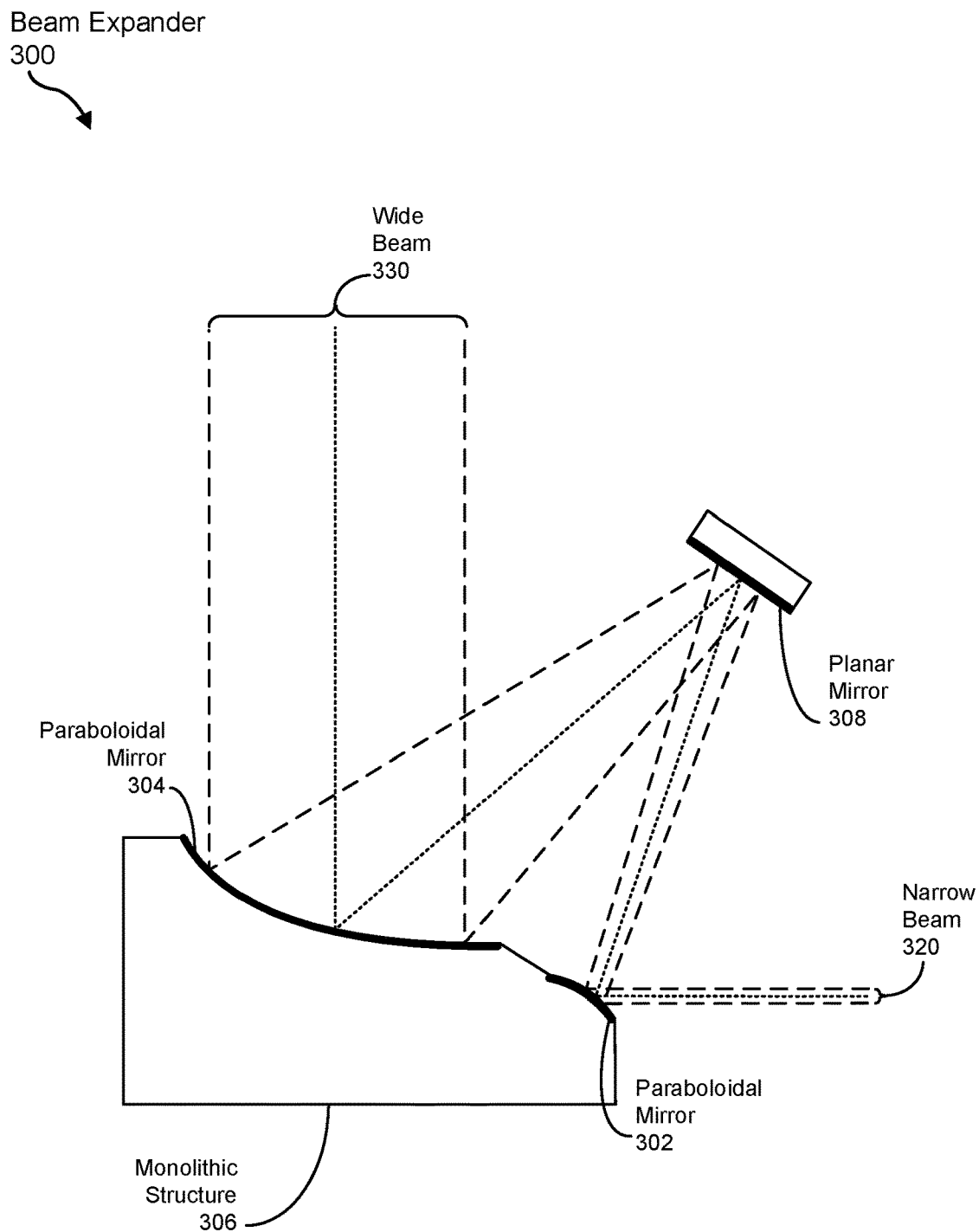
FIG. 3 is a side view of an exemplary optical beam expander that includes a convex paraboloidal mirror and a concave paraboloidal mirror in conjunction with a planar mirror.

FIG. 2 is a side view of an exemplary optical beam expander 200 (e.g., serving as beam expander 102 of FIG. 1) that includes a first (concave) paraboloidal mirror 202 and a second (concave) paraboloidal mirror 204 in conjunction with a planar mirror 208. While the following discussion concentrates on the expanding capability of beam expander 200 (e.g., producing a wide (e.g., collimated) beam 230 in response to receiving a narrow (e.g., collimated) beam 220), beam expander 200 may additionally or alternatively provide a contracting functionality (e.g., producing narrow beam 220 in response to receiving wide beam 230). The embodiments of FIG. 3, also discussed below, may also facilitate beam expansion and/or contraction functionality. Also, the illustrations of FIGS. 2 and 3 are merely representative and do not encompass all possible embodiments associated with the depicted configurations. Additionally, the illustrations of FIGS. 2 and 3 are not necessarily drawn to scale; instead, the illustrations are merely intended to represent various principles associated with the depicted configurations. Also, each of FIGS. 2 and 3 provides approximate indications of the optical axis (via fine dashed lines) and contour of the light being received and directed (via coarse dashed lines) by the beam expanders depicted therein.

As illustrated in FIG. 2, a monolithic structure 206 may define, carry, or otherwise be coupled to both first paraboloidal mirror 202 and second paraboloidal mirror 204. In some embodiments, monolithic structure 206 may be a single substrate (e.g., a sufficiently rigid or stiff material), the surface of which may be machined and processed to define paraboloidal mirrors 202 and 204. In other examples, monolithic structure 206 may be a single substrate that is configured such that a material serving as paraboloidal mirrors 202 and 204 may be deposited upon a surface of monolithic structure 206 to form paraboloidal mirrors 202 and 204. In yet other embodiments, monolithic structure 206 may be a single substrate to which separate paraboloidal mirrors 202 and 204 may be stably affixed. Other embodiments for monolithic structure 206 that serve as a rigid component that defines paraboloidal mirrors 202 and 204 or provides a stable platform to which paraboloidal mirrors 202 and 204 may be attached are also possible.

Beam expander 200 may also include planar mirror 208 having a flat mirrored surface. As described in greater detail below, planar mirror 208 may be configured to be adjusted translationally (e.g., along an axis normal to the reflective plane defined by planar mirror 208) and rotationally (e.g., about two orthogonal axes, each of which are orthogonal to an axis normal to the reflective plane defined by planar mirror 208). Also, in some embodiments, planar mirror 208 may be located and oriented to reflect light received from first paraboloidal mirror 202 toward second paraboloidal mirror 204 (e.g., to align the lines of sight of paraboloid mirrors 202 and 204 and to render paraboloid mirrors 202 and 204 confocal).

In beam expander 200, first paraboloidal mirror 202 may be concave and configured to facilitate reflection of narrow beam 220 as converging light toward planar mirror 208. Moreover, as depicted in FIG. 2, the converging light created by first paraboloidal mirror 202 may form a focal point and begin diverging prior to encountering planar mirror 208. Consequently, in some embodiments, beam expander 200 may include a field stop 210 (e.g., to more sharply define an outer edge of the light being passed between first paraboloidal mirror 202 and planar mirror 208 and/or to minimize stray light from entering the system at off-nominal field angles).

Second paraboloidal mirror 204, in some embodiments, may also be concave and configured to facilitate reflection of light reflected by planar mirror 208 and redirect that light as wide (collimated) beam 230. In some examples, second paraboloidal mirror 204 may be larger than first paraboloidal mirror 204 as a result of first paraboloidal mirror 202 receiving narrow beam 220 and second paraboloidal mirror 204 producing wide beam 230.

In FIG. 2, due to the configuration of paraboloidal mirrors 202 and 204, wide beam 230 is redirected 90 degrees relative to narrow beam 220. In other embodiments, paraboloidal mirrors 202 and 204 may be configured or arranged to produce different angles of redirection generally ranging from greater than zero degrees to less than 180 degrees (e.g., 45 degrees, 60 degrees, 70 degrees, 80 degrees, 90 degrees, 100 degrees, 110 degrees, 120 degrees, 135 degrees, or others). In some examples, directing wide beam 230 to a direction not parallel to narrow beam 220 may facilitate a more space-efficient configuration for a system in which beam expander 200 is utilized (e.g., optical beam telescope 100).

As a result of paraboloidal mirrors 202 and 204 being attached to, or being an integral part of, monolithic structure 206, neither paraboloidal mirror 202 or 204 need be adjusted or aligned, such as during a manufacturing or testing phase of optical beam telescope 100. Instead, in such examples, adjustment may be limited to movement of planar mirror 208 along three degrees of freedom (e.g., tip, tilt, and/or piston along a vector normal to planar mirror 208) to provide the proper translational and rotational alignment of planar mirror 208 relative to paraboloidal mirrors 202 and 204 to render the intended generation and alignment of wide beam 230 relative to narrow beam 220 (and/or vice-versa to generate narrow beam 220 based on a received wide beam 230). Such a configuration may negate the more tedious process of adjusting at least one mirror along six degrees of freedom while potentially facilitating a more space-efficient system design (e.g., for optical beam telescope 100) relative to other beam expanders.

FIG. 3 is a side view of an exemplary optical beam expander 300 (e.g., serving as beam expander 102 of FIG. 1) that includes a first (convex) paraboloidal mirror 302 and a second (concave) paraboloidal mirror 304 in conjunction with a planar mirror 208. In operation, as with beam expander 200 of FIG. 2, beam expander 300 of FIG. 3 receives and processes a narrow beam 320 to produce wide beam 330 (e.g., directed 90 degrees relative to narrow beam 320). Additionally or alternatively, in some embodiments, beam expander 300 may produce narrow beam 320 from a received wide beam 330. As shown in FIG. 3, beam expander 300 may include a monolithic structure 306 defining, or being mechanically affixed to, first paraboloidal mirror 302 and second paraboloidal mirror 304, as well as a separate planar mirror 308. In at least some embodiments, monolithic structure 306, second paraboloidal mirror 304, and planar mirror 308 may be constructed and/or configured in a same or similar fashion as monolithic structure 206, second paraboloidal mirror 204, and planar mirror 208, respectively, of beam expander 200, as described above.

Unlike first paraboloidal mirror 202 of FIG. 2, first paraboloidal mirror 302, as illustrated in FIG. 3, may be convex, and thus may function to direct diverging light toward planar mirror 308 from received narrow beam 320. Consequently, a focal point may not be created between first paraboloidal mirror 302 and planar mirror 308. Also, in some examples, the light path of the diverging light between first paraboloidal mirror 302 and second paraboloidal mirror 304 may be shortened relative to the length of the light path between first paraboloidal mirror 202 and second paraboloidal mirror 204 of beam expander 200 by virtue of first paraboloidal mirror 302 being convex, potentially resulting in a more compact design for beam expander 300 relative to beam expander 200. Also, in some embodiments, as is the case with beam expander 200, first paraboloidal mirror 302 may be smaller than second paraboloidal mirror 304 due to their relative associations with narrow beam 320 and wide beam 330, respectively, as described above in conjunction with FIG. 2.

In addition, in some embodiments, as with beam expander 200 of FIG. 2, beam expander 300 may be properly adjusted through three degrees of freedom of movement of planar mirror 308 (e.g., via tip, tilt, and piston relative to a vector normal to the reflective plane of planar mirror 308). Further, while FIG. 3 depicts beam expander 300 as redirecting wide beam 330 90 degrees relative to narrow beam 320, other angles of redirection greater than zero degrees and less than 180 degrees are also possible with a reconfiguring of paraboloidal mirrors 302 and 304, as described above.

While beam expanders 200 and 300 discussed above employ paraboloidal mirrors 202, 204, 302, and 304, other embodiments for beam expanders may incorporate other concave and/or convex nonplanar mirrors (e.g., elliptical mirrors, conic mirrors, and/or other aspherical mirrors) to produce converging and/or diverging light to convert between optical beams (e.g., collimated beams), as indicated in FIGS. 2 and 3.

Figure 4:
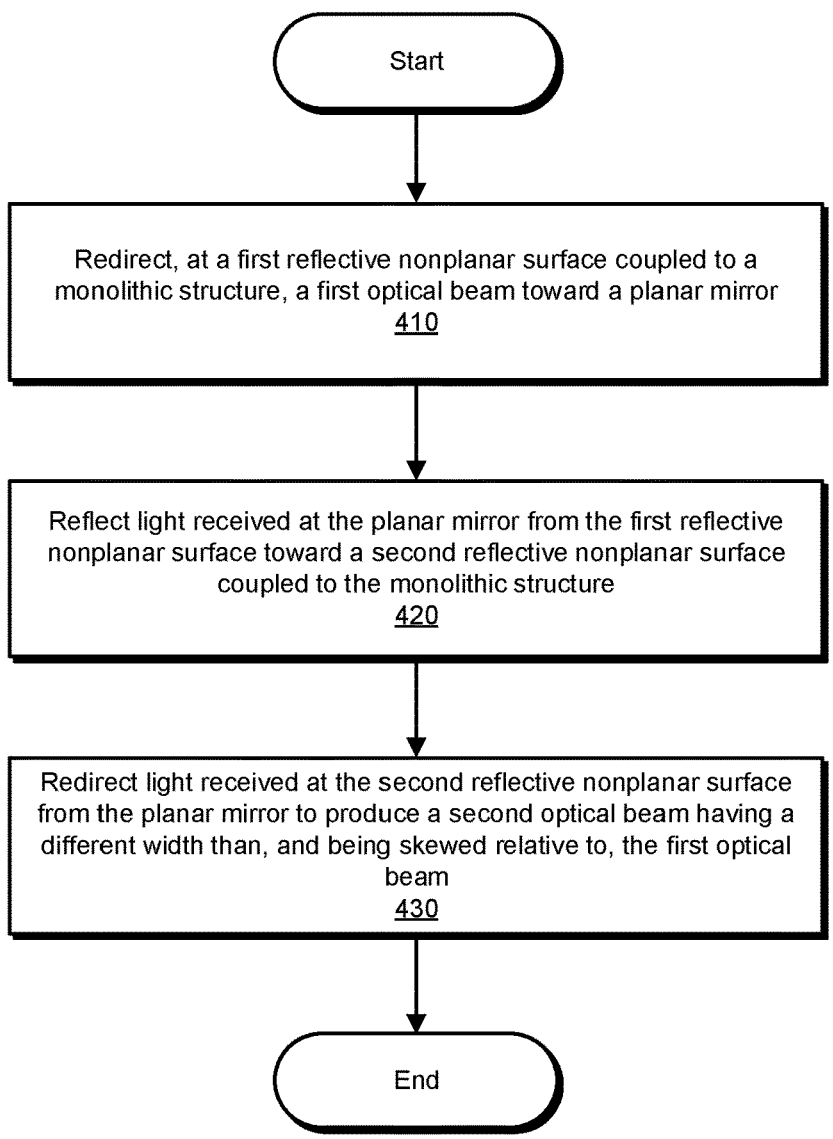
FIG. 4 is a flow diagram of an exemplary method of expanding an optical beam.

FIG. 4 is a flow diagram of an exemplary method 400 of expanding an optical (e.g., collimated) beam. While method 400 is described below as being performed by beam expander 200 or 300 of FIGS. 2 and 3, respectively, other beam expanders not specifically described herein may perform the steps of method 400 in other embodiments. Moreover, while method 400 is described below as expanding narrow beam 220 or 320 to produce wide beam 230 or 330, method 400 may also be used to produce narrow beam 220 or 320 from wide beam 230 or 330.

In method 400, at step 410, a first optical beam (e.g., narrow beam 220 or 320) may be redirected at a first reflective nonplanar surface (e.g., first paraboloidal mirror 202 or 302) toward a planar mirror (e.g., planar mirror 208 or 308), where the first reflective nonplanar surface may be coupled to, or defined by, a monolithic structure (e.g., monolithic structure 206 or 306). At step 420, the planar mirror may reflect light from the first reflective nonplanar surface to a second reflective nonplanar surface (e.g., second paraboloidal mirror 204 or 304) that also may be coupled to the monolithic structure. At step 430, the second reflective nonplanar surface may redirect light received from the planar mirror to produce a second optical beam (e.g., wide beam 230 or 330) having a different width than, and being skewed relative to, the first optical beam.

In some examples, an optical beam expander (sometimes referred to herein as a beam expander) may include a first nonplanar mirror and a second nonplanar mirror that may be integral to or fixably attached to a monolithic body to form a monolithic structure. In some examples, first and second nonplanar mirrors may include separate depressions or convex profiles (e.g., concave depressions, such as parabolic depressions) formed in a monolithic structure. In some examples, a monolithic structure may include one or more of a glass (e.g., a silica glass), ceramic, semiconductor (e.g., silicon), metal, dielectric material (e.g., a nitride, carbide, or an oxide such as an electrically insulating metal oxide such as silica, aluminum oxide, titanium oxide, or other oxide), or other material. However, these examples are non-limiting and the monolithic structure may include any suitable material.

In some examples, a concave and/or convex surface portion may be formed in an example monolithic structure using one or more methods, such as molding, chemical etching, laser ablation, abrasion (e.g., polishing), or one or more other processes or combinations thereof.

In some examples, a mirror (such as a planar or nonplanar mirror) may include a reflective layer and may optionally include one or more additional layers such a protective layer formed over the reflective layer, or an adhesion promoter to improve adhesion of the reflective mirror to a monolithic body. A reflective layer may include a metal layer (which may include gold, silver, aluminum, or another metal), and/or one or more dielectric layers. In some examples, a mirror may include a reflective layer including a multilayer structure (e.g., a Bragg reflector or photonic crystal). Other suitable configurations may be used. A reflective layer, and optionally other layers such as protective layers, may be formed on a nonplanar (e.g., curved) surface of monolithic body to form a generally monolithic structure including nonplanar mirrors.

In some examples, an optical beam expander may include a monolithic structure including or otherwise supporting first and second nonplanar mirrors. The first nonplanar mirror may be configured to receive an optical beam (e.g., as an input beam) and reflect the optical beam towards an optically intervening mirror, which may be planar mirror. The optical beam may then be reflected from the optically intervening mirror to the second nonplanar mirror, and reflected from the second nonplanar mirror, for example, to form the output beam. The input beam may have an input beam diameter, and the output beam may have an output beam diameter. In some examples, the output beam diameter may be at least double the input beam diameter, and in some examples may be at least five times greater, and in some examples the output beam diameter may be at least ten times greater than input beam diameter. In some examples, the input beam and the output beam may be approximately perpendicular to each other. In some examples, the output beam may have an output beam direction with angle of between 60 degrees and 120 degrees relative to the input beam direction, such as between 70 degrees and 110 degrees.

In some examples, the first nonplanar mirror may be configured to produce a diverging beam from the input beam. The input beam may be a generally collimated beam, and may be narrower than the output beam, which may also be collimated. The first nonplanar mirror may be a convex or concave mirror. In the case of a concave mirror, divergence may be observed beyond a point of focus. An aperture, such as field stop, may be located near the point of focus, for example, to reduce stray light. The optically intervening mirror may be located beyond the point of focus of a first nonplanar mirror, if the first nonplanar mirror is concave. The divergence may be retained after reflection from the optically intervening mirror. The second nonplanar mirror may then be configured to produce a non-diverging beam (such as a collimated beam) from the diverging light beam received by reflection from the optically intervening mirror. The optically intervening mirror may help reduce the overall dimensions of the beam expander.

In some examples, a beam expander may include a plurality of optically intervening mirrors, such as a plurality of planar mirrors. A diverging light beam, produced by the first nonplanar mirror, may be reflected successively from each of the plurality of optically intervening mirrors (e.g., in a zig-zag or other angular path) before reaching the second nonplanar mirror. One or more optically intervening mirrors may be used to fold or otherwise redirect the path of the diverging light beam produced by the first nonplanar mirror, one or more times, which may allow greater beam expansion and/or a reduced physical size of the beam expander.

In some examples, the optical beam expander may be a component of a free-space optical communications system, and may be used to transmit an expanded optical beam (e.g., an expanded laser beam) towards a remote receiver. In some examples, the term an optical beam is not limited to visible light. In some examples, an optical beam may include infrared (IR) radiation (e.g., near-IR radiation), visible radiation, and/or ultraviolet (UV) radiation (e.g., near-UV radiation). Similarly, in some examples, the term light may include non-visible electromagnetic radiation, such as IR radiation. In some examples, the remote receiver may be located on a satellite or airborne vehicle such as a balloon or aircraft. In some examples, an example optical beam expander may be a component of a free-space optical communications system or device configured for data transmission to and/or from space, to or from aircraft, within an outdoors environment, or within or between buildings. An optical beam may be used to encode data, for example, using frequency, pulse width, and/or amplitude modulation, and/or other data encoding approach. In some examples, an optical beam may include a plurality of wavelengths. An optical beam expander according to some examples may show no appreciable dispersion effects for the plurality of wavelengths. The output beam from the optical beam expander may have an approximately plane wavefront, and may be a generally collimated optical beam. In some examples, the first nonplanar mirror and/or the second nonplanar mirror may include a concave or convex mirror. In some examples, the optical axes of the first and second nonplanar mirrors may be non-parallel, and in some examples there may be an angle of at least 20 degrees between the optical axes of the two nonplanar mirrors.

In some examples, the input beam may be provided by an optical source, and the optical source may include one or more lasers, light-emitting diodes (LEDs), and/or other light sources. In some examples, the optical source may be a pulsed optical source. In some examples, the input beam may be provided by an optical amplifier. In some examples, an optical modem may include an optical source and network data may be encoded onto an optical signal. The optical signal may be amplified by an optical amplifier to provide the input beam.

In some examples, a beam expander may be used to receive an optical beam, for example, over a free-space optical link. The received optical beam may pass through the beam expander in the opposite direction to a transmitted beam, and the beam diameter may be reduced. The reduced diameter beam may then be received by a low noise amplifier (e.g., including one or more optical detectors and associated components) and the received signal passed to a modem. The received optical beam may be encoded with network data, and the modem may extract the network data from the received signal and provide the network data to a network.

In some examples, a beam expander may include two nonplanar mirrors in a fixed geometrical relationship defined by a monolithic structure, and at least one optically intervening mirror that may, in some examples, include a planar mirror. In some examples, an optically intervening mirror may be a planar, concave or convex mirror configured to allow beam expansion within the optical path between the first nonplanar mirror and the second nonplanar mirror. In some examples, the beam expander may be configured so that input light (such as an input beam) is reflected from a first nonplanar mirror to the optically intervening mirror, then reflected from the optically intervening mirror to the second nonplanar mirror, then reflected from the second nonplanar mirror to form the output beam. The output beam may be a generally collimated optical beam that is appreciably optically expanded relative to the input beam, for example, having an output beam diameter of at least twice that of the input beam diameter. The diameter of the second nonplanar mirror may be greater than that of the first nonplanar mirror (e.g., having a diameter at least twice that of the first nonplanar mirror). In some examples, mirrors may be sized based on (e.g., proportionate to) the expected beam diameter of a beam incident thereon, and may be located and oriented to obtain a desired beam expansion. In some examples, an optically intervening mirror may be rigidly supported relative to the monolithic structure. In some examples, an optically intervening mirror may have an adjustable position and/or orientation that may allow beam steering of the output beam.

In view of the discussion above in conjunction with FIGS. 1-4, a beam expander may produce a wide optical beam from a narrow optical beam, and/or vice-versa, via two nonplanar mirrors or reflective surfaces coupled together via a monolithic structure such that use of an optically intervening planar mirror may facilitate non-parallel redirection of the produced beam relative to the received beam. Such a configuration may result in a space-efficient configuration of an optical telescope or other system in which the beam expander is deployed. Further, proper optical alignment of the beam expander may be accomplished via relatively simple translational and rotational adjustment of the planar mirror in three degrees of freedom (e.g., tip, tilt, and piston).

EXAMPLE EMBODIMENTS

Example 1: An optical beam expander may include (1) a monolithic structure including (a) a first nonplanar mirror that receives a first collimated optical beam having a first width and reflects the first collimated optical beam to generate a noncollimated optical beam and (b) a second nonplanar mirror that receives a diverging optical beam and reflects the diverging optical beam to generate a second collimated optical beam having a second width greater than the first width, where the first nonplanar mirror and the second nonplanar mirror are fixed in orientation and position relative to each other and (2) a planar mirror that reflects the noncollimated optical beam from the first nonplanar mirror to provide the diverging optical beam to the second nonplanar mirror.

Example 2: The optical beam expander of Example 1, where the first nonplanar mirror may include a concave mirror that reflects the first collimated optical beam toward the planar mirror as a converging optical beam.

Example 3: The optical beam expander of Example 2, where the converging optical beam may form a focal point between the first nonplanar mirror and the planar mirror at which the converging optical beam transitions to the diverging optical beam.

Example 4: The optical beam expander of Example 3, where the optical beam expander may further include a field stop located at the focal point.

Example 5: The optical beam expander of Example 1, where the first nonplanar mirror may include a convex mirror that reflects the first collimated optical beam toward the planar mirror as the diverging optical beam.

Example 6: The optical beam expander of any one of Examples 1-5, where the first collimated optical beam and the second collimated optical beam may be skewed relative to each other.

Example 7: The optical beam expander of Example 6, where the first collimated optical beam and the second collimated optical beam may be oriented 90 degrees relative to each other.

Example 8: The optical beam expander of any one of Examples 1-5, where the first nonplanar mirror and the second nonplanar mirror each may be an integral portion of the monolithic structure.

Example 9: The optical beam expander of Example 8, where each of the first nonplanar mirror and the second nonplanar mirror may include a material deposited onto a surface of the monolithic structure.

Example 10: The optical beam expander of any one of Examples 1-5, where the first nonplanar mirror and the second nonplanar mirror may include at least one concave mirror.

Example 11: The optical beam expander of any one of Examples 1-5, where an adjustment of the planar mirror may be limited to three or fewer degrees of freedom.

Example 12: The optical beam expander of Example 11, where the three or fewer degrees of freedom may include at least one of tip, tilt, or piston.

Example 13: A method may include (1) reflecting, at a first reflective nonplanar surface fixably coupled to a monolithic structure, toward a planar mirror, a first collimated optical beam having a first width to generate a noncollimated optical beam, (2) reflecting, at the planar mirror, the noncollimated optical beam from the first reflective nonplanar surface toward a second reflective nonplanar surface fixably coupled to the monolithic structure, and (3) reflecting the noncollimated optical beam received at the second reflective nonplanar surface from the planar mirror to produce a second collimated optical beam having a second width greater than the first width, where the first reflective nonplanar surface and the second reflective nonplanar surface are fixed in orientation and position relative to each other.

Example 14: The method of Example 13, where the second collimated optical beam may be skewed relative to the first collimated optical beam.

Example 15: The method of Example 14, where the second collimated optical beam may be oriented 90 degrees relative to the first collimated optical beam.

Example 16: The method of any one of Examples 13-15, where (1) the first reflective nonplanar surface may include a first concave paraboloid mirror and (2) the second reflective nonplanar surface may include a second concave paraboloid mirror.

Example 17: The method of any one of Examples 13-15, where (1) the first reflective nonplanar surface may include a convex mirror and (2) the second reflective nonplanar surface may include a concave mirror.

Example 18: An optical beam telescope may include (1) a beam generation subsystem that generates a first light carrying transmission data, (2) an optical subsystem that processes the first light to generate a first collimated optical beam having a first width, and (3) an optical beam expander including (a) a monolithic structure including (i) a first nonplanar mirror that reflects the first collimated optical beam to generate a noncollimated optical beam and (ii) a second nonplanar mirror that receives a diverging optical beam and reflects the diverging optical beam to generate a second collimated optical beam having a second width greater than the first width, where the second collimated optical beam carries the transmission data through free space, where the first nonplanar mirror and the second nonplanar mirror are fixed in orientation and position relative to each other and (b) a planar mirror that reflects the noncollimated optical beam from the first nonplanar mirror as the diverging optical beam toward the second nonplanar mirror.

Example 19: The optical beam telescope of Example 18, where (1) the second nonplanar mirror may receive a third collimated optical beam having the second width and reflects the third collimated optical beam toward the planar mirror to generate a converging optical beam, where the third collimated optical beam carries reception data through free space, (2) the planar mirror may reflect the converging optical beam from the second nonplanar mirror toward the first nonplanar mirror, (3) the first nonplanar mirror may reflect the converging optical beam toward the optical subsystem to generate a fourth collimated optical beam having the first width, (4) the optical subsystem may process the fourth collimated optical beam to generate a second light carrying the reception data, and (5) the optical beam telescope may further include a beam detection subsystem that processes the second light to recover the reception data.

Example 20: The optical beam telescope of Example 19, where the optical beam expander may receive the first collimated optical beam and the third collimated optical beam simultaneously.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An optical beam expander comprising:
    a monolithic structure comprising:
        a first nonplanar mirror that receives a first collimated optical beam having a first width and reflects the first collimated optical beam to generate a noncollimated optical beam; and
        a second nonplanar mirror that receives a diverging optical beam and reflects the diverging optical beam to generate a second collimated optical beam having a second width greater than the first width,
        wherein the first nonplanar mirror and the second nonplanar mirror are fixed in orientation and position relative to each other; and
    a planar mirror that reflects the noncollimated optical beam from the first nonplanar mirror to provide the diverging optical beam to the second nonplanar mirror.

2. The optical beam expander of claim 1, wherein the first nonplanar mirror comprises a concave mirror that reflects the first collimated optical beam toward the planar mirror as a converging optical beam.

3. The optical beam expander of claim 2, wherein the converging optical beam forms a focal point between the first nonplanar mirror and the planar mirror at which the converging optical beam transitions to the diverging optical beam.

4. The optical beam expander of claim 3, further comprising a field stop located at the focal point.

5. The optical beam expander of claim 1, wherein the first collimated optical beam and the second collimated optical beam are skewed relative to each other.

6. The optical beam expander of claim 5, wherein the first collimated optical beam and the second collimated optical beam are oriented 90 degrees relative to each other.

7. The optical beam expander of claim 1, wherein the first nonplanar mirror and the second nonplanar mirror are each an integral portion of the monolithic structure.

8. The optical beam expander of claim 7, wherein each of the first nonplanar mirror and the second nonplanar mirror comprises a material deposited onto a surface of the monolithic structure.

9. The optical beam expander of claim 1, wherein the first nonplanar mirror and the second nonplanar mirror may comprise at least one concave mirror.

10. The optical beam expander of claim 1, wherein an adjustment of the planar mirror is limited to three or fewer degrees of freedom.

11. The optical beam expander of claim 10, wherein the three or fewer degrees of freedom comprise at least one of tip, tilt, or piston.

12. A method comprising:
    reflecting, at a first reflective nonplanar surface coupled to a monolithic structure, toward a planar mirror, a first collimated optical beam having a first width to generate a noncollimated optical beam;
    reflecting, at the planar mirror, the noncollimated optical beam from the first reflective nonplanar surface toward a second reflective nonplanar surface coupled to the monolithic structure; and
    reflecting the noncollimated optical beam received at the second reflective nonplanar surface from the planar mirror to produce a second collimated optical beam having a second width greater than the first width, wherein the first reflective nonplanar surface and the second reflective nonplanar surface are fixed in orientation and position relative to each other.

13. The method of claim 12, wherein the second collimated optical beam is skewed relative to the first collimated optical beam.

14. The method of claim 13, wherein the second collimated optical beam is oriented 90 degrees relative to the first collimated optical beam.

15. The method of claim 12, wherein:
    the first reflective nonplanar surface comprises a first concave paraboloid mirror; and
    the second reflective nonplanar surface comprises a second concave paraboloid mirror.

16. An optical beam telescope comprising:
    a beam generation subsystem that generates a first light carrying transmission data;
    an optical subsystem that processes the first light to generate a first collimated optical beam having a first width; and
    an optical beam expander comprising:
        a monolithic structure comprising:
            a first nonplanar mirror that reflects the first collimated optical beam to generate a noncollimated optical beam; and
            a second nonplanar mirror that receives a diverging optical beam and reflects the diverging optical beam to generate a second collimated optical beam having a second width greater than the first width, wherein the second collimated optical beam carries the transmission data through free space;
            wherein the first nonplanar mirror and the second nonplanar mirror are fixed in orientation and position relative to each other; and
        a planar mirror that reflects the noncollimated optical beam from the first nonplanar mirror as the diverging optical beam toward the second nonplanar mirror.

17. The optical beam telescope of claim 16, wherein:
    the second nonplanar mirror receives a third collimated optical beam having the second width and reflects the third collimated optical beam toward the planar mirror to generate a converging optical beam, wherein the third collimated optical beam carries reception data through free space;
    the planar mirror reflects the converging optical beam from the second nonplanar mirror toward the first nonplanar mirror;

the first nonplanar mirror reflects the converging optical beam toward the optical subsystem to generate a fourth collimated optical beam having the first width;

the optical subsystem processes the fourth collimated optical beam to generate a second light carrying the reception data; and the optical beam telescope further comprises a beam detection subsystem that processes the second light to recover the reception data.

18. The optical beam telescope of claim 17, wherein the optical beam expander receives the first collimated optical beam and the third collimated optical beam simultaneously.

* * * * *